US010414317B2

(12) United States Patent
Hillawi et al.

(10) Patent No.: US 10,414,317 B2
(45) Date of Patent: Sep. 17, 2019

(54) VEHICLE CUP HOLDER HAVING ADJUSTABLE LIGHT PIPE FINGERS

(71) Applicant: Ford Global Technologies, LLC, Dearborn, MI (US)

(72) Inventors: Inshirah Hillawi, Canton, MI (US); Jason Robert Emrich, Sterling Heights, MI (US); Murali Guntur, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 15/373,110

(22) Filed: Dec. 8, 2016

(65) Prior Publication Data

US 2018/0162257 A1 Jun. 14, 2018

(51) Int. Cl.

*A47K 1/08* (2006.01)
*B60N 3/10* (2006.01)
*B60Q 3/20* (2017.01)

(52) U.S. Cl.

CPC ............... *B60N 3/106* (2013.01); *B60Q 3/20* (2017.02)

(58) Field of Classification Search

CPC .................................. B60N 3/106; B60Q 3/20
USPC ......... 248/346.01, 311.2; 296/37.5; 362/101, 362/154
See application file for complete search history.

(56) References Cited

U.S. PATENT DOCUMENTS 7,597,300 B2 * 10/2009 Harada .............. A47G 23/0225 220/282
8,534,862 B2 * 9/2013 Simon .................... B60N 3/106 362/101
9,707,708 B2 * 7/2017 Bozio .................... B60N 3/106
2008/0186697 A1 * 8/2008 Camarota ............. B60N 3/101 362/101
2009/0152285 A1 * 6/2009 Kearney ................ B60N 3/106 220/737
2010/0032995 A1 2/2010 Tarter et al.
2012/0075842 A1 3/2012 Goto
2012/0217772 A1 * 8/2012 Tang ...................... B60N 3/104 297/188.01
2013/0027955 A1 * 1/2013 Grote, III .................. F21K 9/00 362/510
2015/0175065 A1 * 6/2015 Oh ........................ B60N 3/106 362/154
2017/0066358 A1 * 3/2017 Vaupotic .................. F16B 2/20

FOREIGN PATENT DOCUMENTS

JP 2007203800 A 8/2007

* cited by examiner

*Primary Examiner* — Gwendolyn W Baxter
(74) *Attorney, Agent, or Firm* — Vichit Chea; Price Heneveld LLP

(57) ABSTRACT

A vehicle cup holder is provided and includes a base and a sidewall together defining an interior space for receiving a beverage container. A number of fingers extend through the sidewall for retaining the beverage container. A number of light pipes are each coupled to a corresponding finger for transmitting light into the interior space.

17 Claims, 3 Drawing Sheets

VEHICLE CUP HOLDER HAVING ADJUSTABLE LIGHT PIPE FINGERS

FIELD OF THE INVENTION

The present invention generally relates to vehicle cup holders, and more particularly, vehicle cup holders having illumination means.

BACKGROUND OF THE INVENTION

Vehicle cup holder illumination is becoming ubiquitous in modern day vehicles. However, packaging concerns often limit the location of light sources and other cup holder accessories. As such, there is a need for space saving illumination means.

SUMMARY OF THE INVENTION

According to one aspect of the present invention, a vehicle cup holder is provided and includes a base and a sidewall together defining an interior space for receiving a beverage container. A number of fingers extend through the sidewall for retaining the beverage container. A number of light pipes are each coupled to a corresponding finger for transmitting light into the interior space.

According to another aspect of the present invention, a vehicle cup holder is provided and includes a base and a sidewall together defining an interior space for receiving a beverage container. A number of adjustable fingers extend through the sidewall and are biased to retain the beverage container. A number of light pipes illuminate the receptacle. Each light pipe is coupled to a corresponding finger and is configured to flex in response to adjustment of the corresponding finger.

According to yet another aspect of the present invention, a vehicle cup holder is provided and includes a base and sidewall together defining an interior space. A number of ported fingers extend through the sidewall for retaining a beverage container received in the interior space. A number of light pipes are each coupled to a port of a corresponding finger for transmitting light into the interior space.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
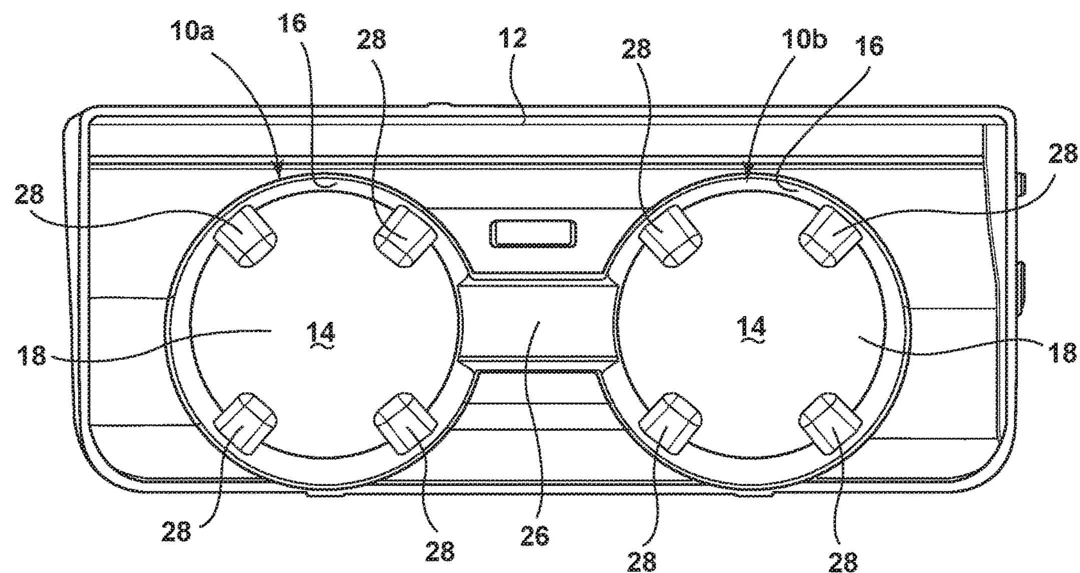
FIG. 1 is a top view of a pair of cup holders for use in a vehicle and assembled to a center console.
Figure 2:
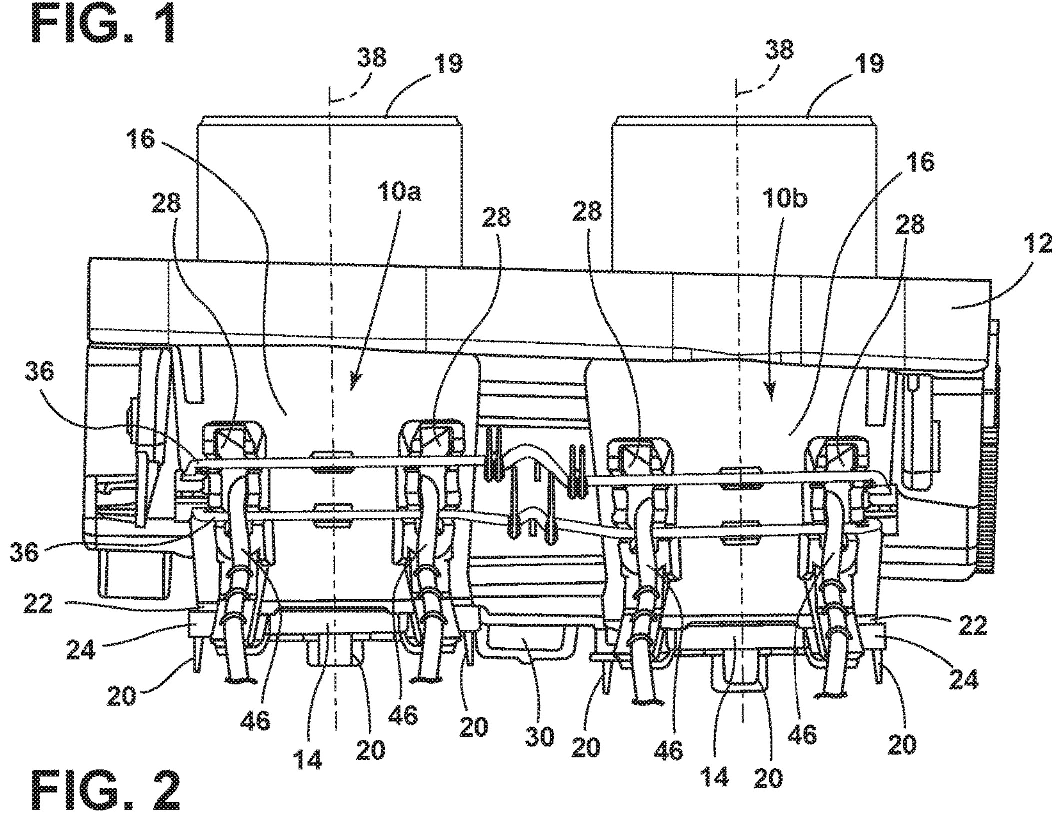
FIG. 2 is a side view of the cup holders shown in FIG. 1.

Referring to FIGS. 1-2, a pair of cup holders **10*a*, 10*b* is shown. The cup holders 10*a*, 10*b* are suited for vehicle use and are coupled to a vehicle fixture exemplarily shown as center console 12. The cup holders 10*a*, 10*b* each include a base 14 and a sidewall 16 together defining an interior space 18 or receptacle for receiving a beverage container 19 (FIG. 2). In the depicted embodiment, the sidewall 16 is a truncated cone having a number of tabs 20 extending downwardly from a bottom portion 22 of the sidewall 16. In assembly, the tabs 20 are each aligned and inserted through a corresponding opening in the base 14 to promote frictional engagement between the sidewall 16 and the base 14. As depicted, the base 14 is circular and includes an outer wall 24 that extends upwardly to frictionally engage a bottom portion 22 of the sidewall 16, thereby further securing the base 14 to the sidewall 16. Optionally, a channel 26 may be provided to connect the sidewalls 16 of each cup holder 10*a*, 10*b*. While the sidewall 16 is shown and described herein as being a truncated cone, the sidewall 16** may be cylindrical, for example, in alternative embodiments.

Figure 3:
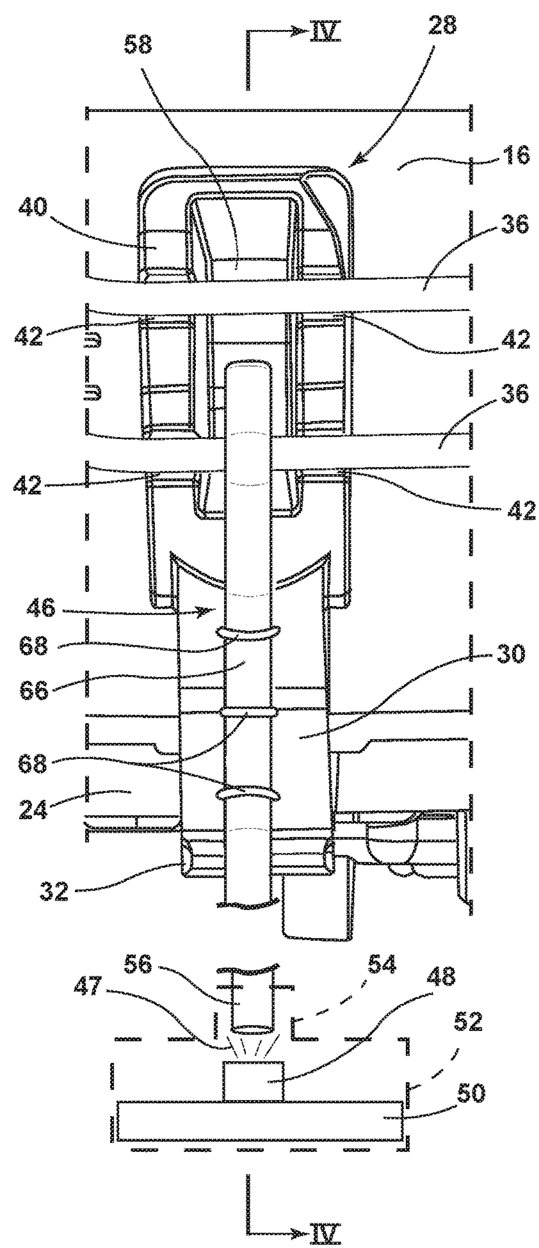
FIG. 3 is an enlarged view of an adjustable finger and neighboring structures.
Figure 4:
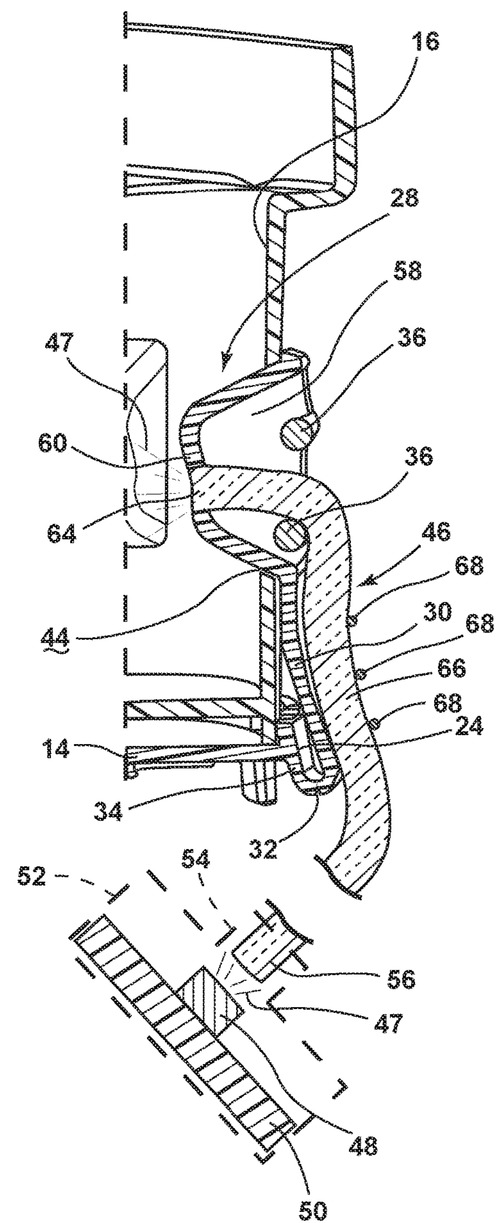
FIG. 4 is a cross-sectional view taken along line IV-IV of FIG. 3.

With reference to FIGS. 1-4, a number of adjustable fingers 28 are positioned about the periphery of the sidewall 16 and extend therethrough into the interior space 18 for retaining the beverage container 19 inside the cup holder **10*a*, 10*b*. As best shown in FIGS. 3 and 4, each finger 28 is hinged to the base 14 via a leg 30 that downwardly projects from the finger 28 and forms a living hinge 32 with a curved arm 34 that downwardly projects from the outer wall 24 of the base 14. The fingers 28 are driven by a biasing member, shown as tension cables 36, which press the fingers 28 radially inward toward a central longitudinal axis 38 (FIG. 2) of the corresponding cup holder 10*a*, 10*b*, and into contact with the beverage container 19. Each finger 28 includes a rear peripheral edge 40 (FIG. 3) that works in conjunction with leg 30 to abut against the sidewall 16, thereby limiting the finger 28 from fully entering the interior space 18. Depending on the size of the beverage container 19, the fingers 28 may self-adjust by pressing against the tension cables 36 so as to move radially outward from the central longitudinal axis 38 in response to coming into contact with a beverage container being received in the corresponding cup holder 10***a*, 10*b*. Accordingly, the tension cables 36 should not be fastened too tightly around the sidewall 16 so as to fully limit or overly burden outward movement of the fingers 28. In the depicted embodiment, the tension cables 36 are secured transversely to slots 42 (FIG. 3) formed in the rear peripheral edge 40 of each finger 28. The tension cables 36 may also be secured to the sidewall 16 by any means known to a skilled artisan. During inward or outward movement of the fingers 28, the tension cables 36 and the living hinge 32 assist in keeping the fingers 28 aligned with corresponding apertures 44 (FIG. 4) formed in the sidewall 16 and through which the fingers 28 extend into the interior space 18.

With reference to FIGS. 2-4, a light pipe 46 is coupled to each finger 28 for transmitting light 47 (FIG. 4) into the interior space 18. Light is provided to the light pipe 46 from a light source such as a light emitting diode (LED) 48 (FIGS. 3 and 4) that is located on a printed circuit board (PCB) 50 having circuitry for controlling and driving the LED 48. In alternative embodiments, the light source may include other forms of lights such as, but not limited to, fluorescent lights, organic LEDs, polymer LEDs, solid-state lights, laser lights, or other lights known to a skilled artisan. The PCB 50 and LED 48 may be contained within a housing 52 having a connector 54 for securing a proximal end 56 of the light pipe 46. While not shown, it is to be understood that the housing 52 may include components (e.g., optics, light barrels, etc.) for directing light emitted by the LED 48 toward the proximal end 56 of the light pipe 46. Furthermore, it is contemplated that the light associated with each light pipe may be provided on a common PCB. Alternatively, each light source may be provided on a separate PCB. With respect to the embodiments described herein, each light pipe 46 may be configured at varying lengths to enable the PCB(s) and any associated light source(s) to be optimally located within a vehicle.

In the depicted embodiment, each light pipe 46 extends between the tension cables 36 and is partially housed in a channeled portion 58 (FIGS. 3 and 4) formed in the rear of the corresponding finger 28. The channeled portion 58 may be C-shaped and feeds to a ported tip 60 (FIG. 4) of the finger 28. The tip 60 constitutes the most radially inward portion of the finger 28 and generally contacts a beverage container received inside the corresponding cup holder 10*a*, 10*b*. The tip 60 may be linear, non-linear, curved, or configured in other geometries, if desired. The port of the tip 60 may be centrally formed, offset, or located at other portions of the finger 28. A distal end 64 (FIG. 4) of the light pipe 46 is fixedly or removably coupled to the port and serves to dispel light 47 contained inside the light pipe 46 into the interior space 18 of the cup holder 10*b*. It is contemplated that the distal end 64 may include integrated optics for focusing or dispersing light being dispelled therefrom.

An intermediate portion 66 (FIGS. 3 and 4) of each light pipe 46 is secured by a retainer, which is exemplarily shown as one or more loops 68 provided on leg 30 and through which the light pipe 46 is inserted during assembly. In alternative embodiments, the retainer may be one or more clips, or other retaining devices known to a skilled artisan. Each light pipe 46 is configured to flex in accordance to the movement of leg 30 about the living hinge 32 in response to adjustment of the corresponding finger 28 in a radially outward or inward direction. Thus, each light pipe 46 may be constructed from flexible materials including, but not limited to, urethane, silicone, flexible polycarbonate, optical grad flexible polypropylene, thermoplastic polyurethane (TPO), optical grade elastomeric, and/or any other flexible mold in clear (MIC) material or mixtures. Each light pipe 46 may be formed through an injection molding process, or any other manufacturing process known to a skilled artisan.

Figure 5:
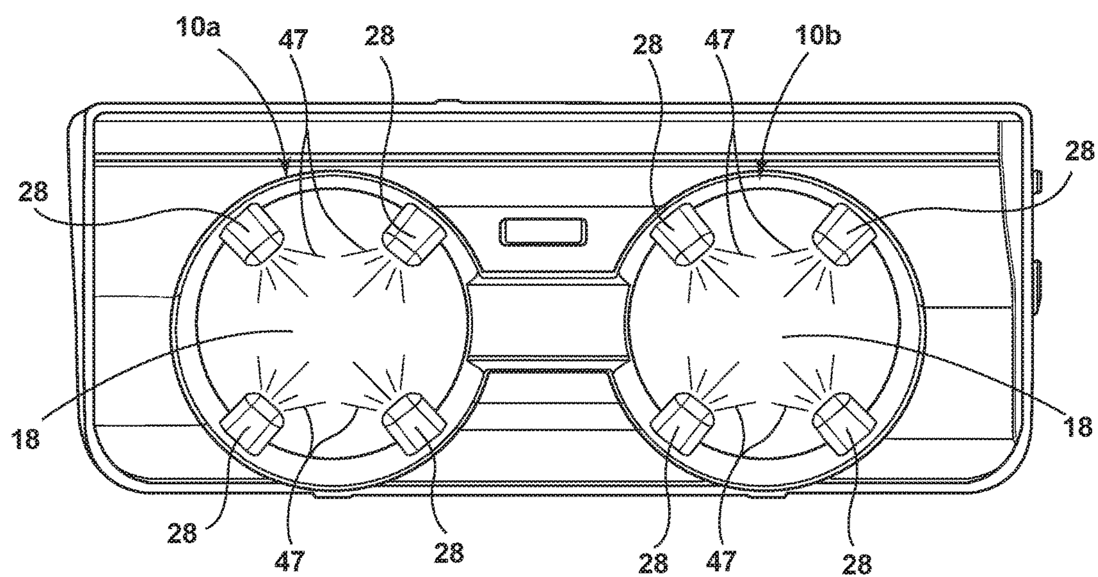
FIG. 5 illustrates the pair of cup holders shown in FIG. 1 in an illuminated state.

Accordingly, by providing a light pipe 46 for each finger 28, nighttime operation of the cup holders 10*a*, 10*b* is enhanced due to the impingement of light 47 into the interior space 18 of the respective cup holder 10*a*, 10*b*, as is generally illustrated in FIG. 5. Additionally, the illumination of the interior space 18 provides a ready reference to locate the cup holders 10*a*, 10*b* and any beverage container received therein in dark conditions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle cup holder comprising:

a base and a sidewall together defining an interior space for receiving a beverage container;

at least one finger extending through the sidewall for retaining the beverage container, wherein the at least one finger is movably coupled to the base via a living hinge; and at least one light pipe having a proximal end configured to receive light from an associated light source and a distal end configured to disperse the received light into the interior space, wherein the light pipe is coupled to a rear portion of the at least one finger.

2. The vehicle cup holder of claim 1, wherein the at least one finger is moveably coupled to the base.

3. The vehicle cup holder of claim 1, wherein the at least one finger is adjustable in a radially inward or radially outward direction with respect to a central longitudinal axis of the cup holder.

4. The vehicle cup holder of claim 1, wherein the light source associated with each light pipe is provided on a common printed circuit board.

5. The vehicle cup holder of claim 1, further comprising a biasing member pressing the at least one finger in a direction toward the interior space.

6. The vehicle cup holder of claim 1, wherein the base further comprises an outer wall that extends upwardly to frictionally engage with a bottom portion of the sidewall.

7. The vehicle cup holder of claim 1, wherein the base forms at least one opening and sidewall further comprises at least one downwardly extending tab, wherein the at least one tab is inserted through the at least one opening.

8. A vehicle cup holder comprising:

a base and a sidewall together defining an interior space for receiving a beverage container;

at least one adjustable finger extending through the sidewall and biased to retain the beverage container; and at least one light pipe for illuminating the interior space, the at least one light pipe having a proximal end configured to receive light from an associated light source and a distal end coupled to the at least one finger and configured to disperse the received light into the interior space, wherein the light pipe is configured to flex in response to adjustment of the at least one finger.

9. The vehicle cup holder of claim 8, wherein the at least one finger is movably coupled to the base via a downwardly extending leg hinged to an arm extending from the base.

10. The vehicle cup holder of claim 9, wherein the leg is hinged to the arm via a living hinge.

11. The vehicle cup holder of claim 9, wherein the at least one light pipe comprises an intermediate portion secured to a corresponding leg.

12. The vehicle cup holder of claim 11, wherein the at least one light pipe flexes in accordance to the movement of the corresponding leg in response to adjustment of the at least one finger.

13. The vehicle cup holder of claim 8, further comprising a biasing member pressing the at least one finger toward the interior space.

14. A vehicle cup holder comprising:

a base and sidewall together defining an interior space;

at least one ported finger comprising a channeled portion formed in the rear of the at least one finger, the at least one finger extending through the sidewall for retaining a beverage container received in the interior space;

at least one light pipe partially housed within the channeled portion of the at least one finger, the light pipe having a proximal end configured to receive light and a distal end coupled to a port of the at least one finger wherein the distal end is configured to disperse the received light into the interior space; and at least one of tension cable for pressing the at least one finger toward the interior space, and wherein the at least one light pipe extends transverse to the at least one tension cable and into the channeled portion to allow the distal end of the at least one light pipe to be fixedly or removably coupled to the port of the at least one finger.

15. The vehicle cup holder of claim 14, wherein the at least one finger is hinged to the base.

16. The vehicle cup holder of claim 14, wherein the at least one finger comprises a tip at which the port is located and corresponding to the most radially inward portion with respect to a central longitudinal axis of the cup holder.

17. The vehicle cup holder of claim 14, wherein the channeled portion is C-shaped.

* * * * *